United States Patent [19]

Lechner

[11] Patent Number: 5,365,920
[45] Date of Patent: Nov. 22, 1994

[54] SOLAR CONCENTRATOR SYSTEM

[75] Inventor: Rudolf Lechner, Singen, Germany

[73] Assignee: Bomin Solar GmbH & Co. KG, Lorrach, Germany

[21] Appl. No.: 743,327

[22] PCT Filed: Feb. 21, 1990

[86] PCT No.: PCT/DE90/00118

§ 371 Date: Aug. 22, 1991

§ 102(e) Date: Aug. 22, 1991

[87] PCT Pub. No.: WO90/10182

PCT Pub. Date: Sep. 7, 1990

[30] Foreign Application Priority Data

Mar. 1, 1989 [CH] Switzerland .......... 749/89-5
Jan. 16, 1990 [CH] Switzerland .......... 126/90-7

[51] Int. Cl.⁵ .............................. F24J 2/10
[52] U.S. Cl. ................... 126/696; 126/600; 126/685; 126/697
[58] Field of Search ........... 126/424, 425, 438, 439, 126/442, 426, 451, 443, 697, 696, 685, 600, 692, 693

[56] References Cited

U.S. PATENT DOCUMENTS

| | | | |
|---|---|---|---|
| 1,880,938 | 10/1932 | Emmet | 126/443 |
| 3,125,091 | 3/1964 | Sleeper, Jr. | 126/426 |
| 4,038,972 | 8/1977 | Orrison | 126/425 |
| 4,051,834 | 10/1977 | Fletcher | 126/426 |
| 4,136,671 | 1/1979 | Whiteford | . |
| 4,273,104 | 6/1981 | Uroshevich | 126/439 |
| 4,313,422 | 2/1982 | McEntee | 126/426 |
| 4,440,149 | 4/1984 | Hattan | 126/438 |
| 4,458,673 | 7/1984 | Benjamin | 126/426 |
| 4,543,945 | 10/1985 | Hattan | 126/426 |
| 4,548,482 | 10/1985 | Williams et al. | . |
| 4,552,126 | 11/1985 | Boyd | . |
| 4,559,926 | 12/1985 | Butler | 126/438 |

FOREIGN PATENT DOCUMENTS

| | | | |
|---|---|---|---|
| 0019016 | 12/1979 | European Pat. Off. | . |
| 71905 | 2/1983 | European Pat. Off. | 126/438 |
| 1319144 | 1/1963 | France | 126/424 |
| 2261489 | 9/1975 | France | . |
| 2362347 | 4/1978 | France | 126/438 |
| 2471564 | 6/1981 | France | 126/424 |
| 2497927 | 7/1982 | France | . |
| 2733915 | 2/1979 | Germany | . |
| 2830335 | 1/1980 | Germany | . |
| 2932645 | 2/1981 | Germany | . |
| 315863 | 12/1988 | Japan | . |
| 2104644 | 3/1983 | United Kingdom | 126/426 |

Primary Examiner—James C. Yeung
Attorney, Agent, or Firm—James Creighton Wray

[57] ABSTRACT

The solar concentrator arrangement has a concentrating mirror (2) consisting of a metallised plastic shell to reflect parallel incident light. The concentrating mirror (2) forms part of a foil tube (1) and co-operates with a secondary concentrator (5) which deflects the parallel incident light beams (3,4) from the concentrating mirror concentrically on a heat exchanger. The heat exchanger (7) is placed on the focal line of the secondary concentrator (5) are rigidly secured together and can be automatically moved in relation to the heat exchanger (7) according to the position of the sun.

21 Claims, 4 Drawing Sheets

SOLAR CONCENTRATOR SYSTEM

The present invention refers to a solar concentrator system comprising at least one metallized foil strip and heat exchanger means located in front of said metallized foil strip such that solar radiation hitting on the metallized surface of said metallized foil strip is reflected towards said heat exchanger means.

BACKGROUND OF THE INVENTION

Known solar concentrator systems usually comprise heavy reflector elements made of glass and/or metal which are expensive to manufacture because their shape must be finished very accurately. In the past, it has been proposed to make use of lighter foil mirrors instead of the heavy glass or metal mirrors. Thereby, a metallized foil is tentered over a frame made of fibre composite material and brought into a parabolic shape. Thus, the weight of such a mirror element is approximately one quarter of the weight of a comparable mirror element made of glass or metal. Such a solar concentrator system comprises an essentially inexpensive, lightweight concentrator incorporating a metallized plastic foil with fixed focus. On the other side, the frame must be precisely and expensively manufactured to the calculated shape whereby even minor deviations from the ideal or theoretically required shape result in a substantial degradation of the efficiency of the system.

SUMMARY OF THE INVENTION

It is an object of the present invention to provide an improved solar concentrator system.

Features of the invention are set forth in claim 1.

Thus, the expensive, fragile, heavy and optically inaccurate parabolic cylinder mirrors can be replaced by inexpensive, light and unbreakable mirrors with high optical precision. The circular cylinder face can be realized easily with the required accuracy. By means of a secondary concentrator mirror, the final focusing of the solar radiation can be effected.

Expedient embodiments of the invention are set forth in the dependent claims 2–20. A process of manufacturing is described in claim 21.

BRIEF DESCRIPTION OF THE DRAWINGS

In the following, some embodiments of the solar concentrator system of the invention will be further described, with references to the accompanying drawings, in which:

FIG. 2A shows a schematic view of another embodiment;

DETAILED DESCRIPTION OF THE DRAWINGS

Figure 1:
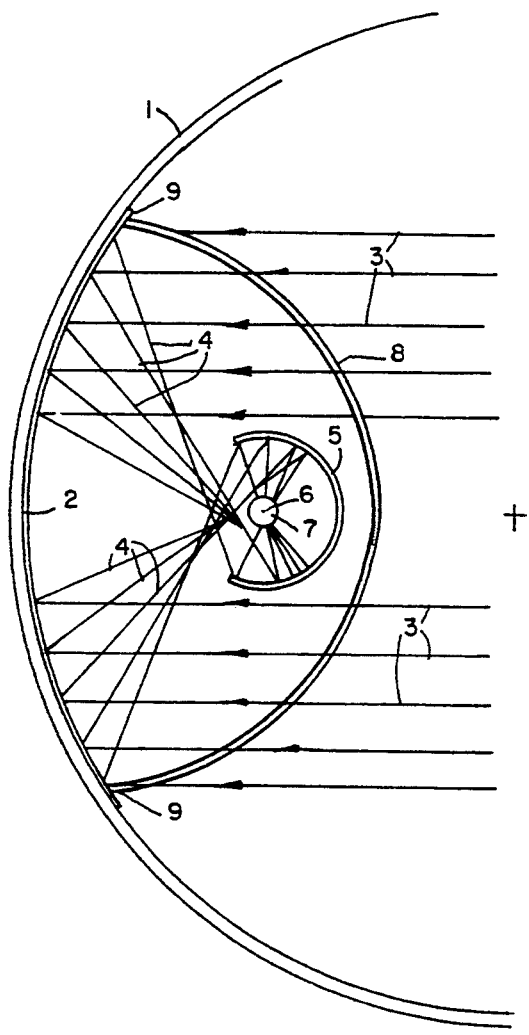
FIG. 1 shows the basic design of a solar concentrator system according to the invention in a cross-sectional view.

The solar concentrator system according to the invention comprises a concentrator mirror having a metallized plastic foil to reflect solar radiation hitting the reflecting surface in parallel relationship. The concentrator mirror of the invention is used in place of the cylindrical parabolic concentrators made of mirror glass and should provide an equal or even a better concentration of the solar radiation hitting the surface of the concentrator. The concentrator mirror of the invention is located on a portion of a plastic foil having circular cross-section, e.g. on a partial face of a circular cylinder jacket. For this purpose, a tubular foil 1 is used which is highly transparent and comprises circular cylindrical shape in cross-section. Such a shape is assured by providing a pressure in the interior of said tubular foil 1 which is higher than atmospheric pressure. In FIG. 1 of the drawings, only a partial cross-sectional view of a tubular foil 1 is shown.

A strip-like portion of the tubular foil 1 is provided with a metallized reflecting layer forming a concentrator mirror 2 for reflecting solar radiation 3 impinging on its metallized surface in parallel relationship. This solar radiation 3 being parallely incident is reflected by the metallized surface of the concentrator mirror 2 whereby the reflected rays 4 impinge on the concave inner surface on a secondary concentrator 5. The latter one is in the shape of a cylindrical jacket as well and is curved and located in such a way that the entire bundle of rays exactly impinges on the focus line 6 of the secondary concentrator 5. Thus the secondary concentrator 5 forms a cylindrical hollow space light trap which is metallized over its entire inner surface and has a central focus line 6.

A heat exchanger in the form of a tube 7 extends along the focus line 6, and a heat carrier liquid circulates through the tube 7 and is heated under the influence of the concentrated solar radiation.

Figure 2A:
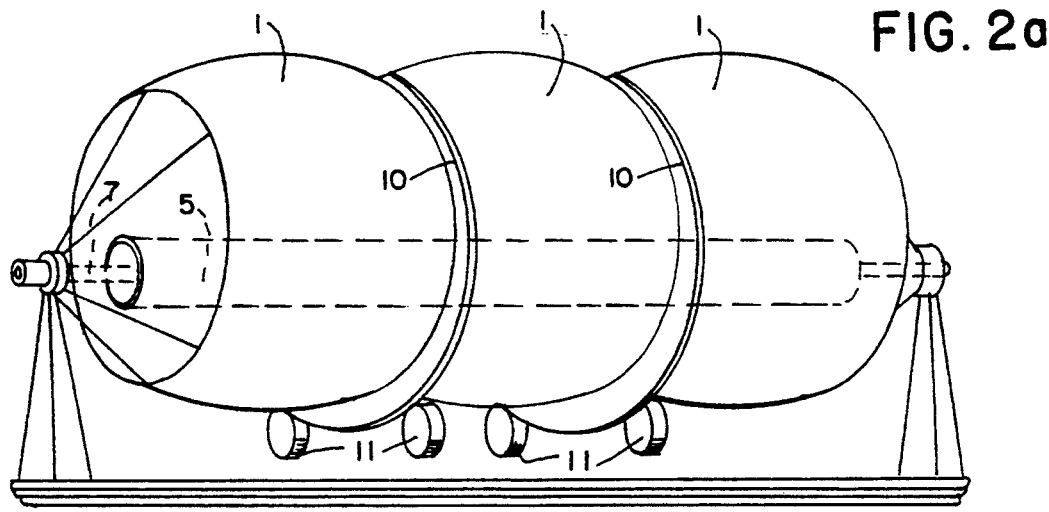
FIG. 2A shows a schematic view of the design.
Figure 2B:
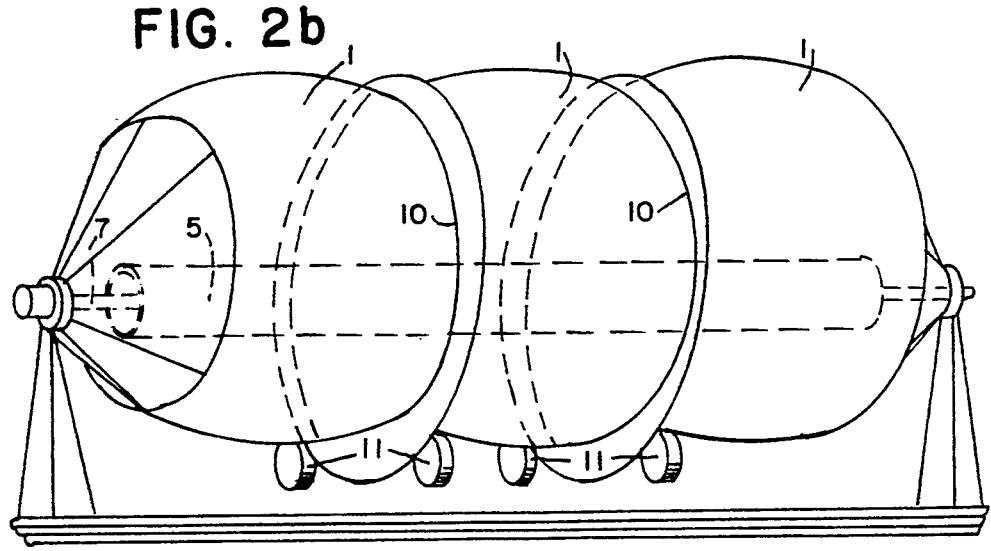
FIG. 2C shows a schematic with the clamping rails.
Figure 2C:
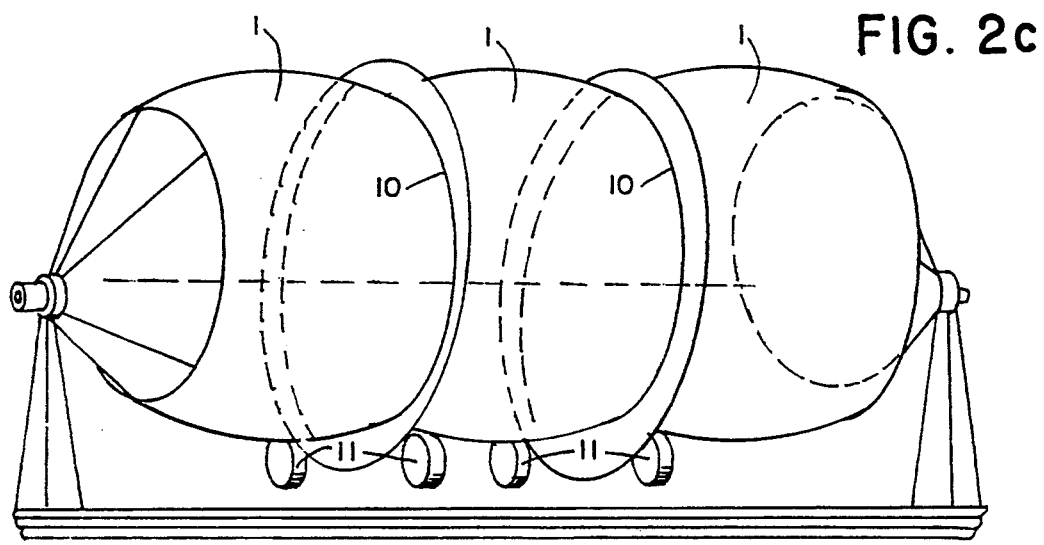

Advantageously the design of the entire solar concentrator system is such that the central axis of the tube 7 runs exactly horizontally from east to west (see FIG. 2). The parallel light rays 3 form a plane together with this east-west-axis of the heat exchanger tube 7, the elevation angle of this plane being 0° at sunrise and sunset and taking a certain maximum value at noon in response to the changing of the seasons. If the concentrator mirror 2 is rotated around the axis of the heat exchanger tube 7, the latter one is maximally subjected to solar radiation during all the day; thereby, the heat exchanger 7 itself is not rotated and can be connected directly to a heat recovering system without the need to provide expensive coupling means. However, it is essential that the concentrator mirror 2 and the secondary concentrator 5 are rigidly connected to each other to form an integral constructive unit which is automatically rotated in response to the position of the sun.

Another possibility is to design the tubular foil 1 as well as the concentrator mirror 2 immovable and rigid while the heat exchanger tube 7 is adjusted along a circular path in response to the position of the sun. In this case the heat exchanger tube 7 is cranked and comprises an angled leg which is adjustable relative to said integral constructive unit in response to the position of the sun.

However, it must be mentioned that a larger portion of the tubular foil 1 must be metallized in this case with the result that the concentrator mirror 2 has greater dimensions. Another possibility is to provide a much smaller foil; in place of the tubular foil 1 a foil element 8 (FIG. 1) is provided which has lens-shaped cross-section and comprises a corresponding reflecting layer. Again, the so formed lens-shaped envelope is closed at both ends and tensioned by an interior pressure which is higher than the atmospheric pressure. In most cases it is necessary to provide an additional supporting frame keeping the four corners 9 of the lens-shaped envelope in position.

Coming back to the embodiment with a tubular foil 1 in the shape of a circular cylindrical jacket, it must be mentioned that the plastic envelope tensioned by internal pressure is provided with support rings 10 located a certain distance from each other and extending in parallel vertical planes. This additional measure is particularly essential if the tubular foil 1 has a great length. By the provision of the support rings 10 the plastic envelope will take a barrel-like shape with the result that the inner surface is provided with an astigmatic mirror face. The tubular foil 1 with its support rings 10 rests on rollers 11 in order to enable the tubular foil 1 to be rotated in response to the position of the sun.

In the heat exchanger tube 7 of the solar concentrator system a heat carrier liquid is heated up and circulated through a steam generator to produce overheated steam which drives a turbine with a generator to produce electrical current.

A further possibility, not shown in the drawings, consists of providing the inner surface of an air-inflated tent with a metallized layer to form a concentrator mirror. In the interior of that air-inflated tent an integral constructive unit consisting of a secondary concentrator and a heat exchanger tube is adjustably arranged to be moved along a circular path in response to the position of the sun.

In the designs comprising a longitudinal plastic envelope with circular cylindrical cross-section, it is advantageous to use support members which are connected to pillow blocks located at both ends of the plastic envelope to form a rigid frame. The support members can be designed as rigid semicircular rings or as closed rope loops. It is understood that both kinds of support members can be combined. Particularly the upper support ring can be rigid and the lower support member can consist of a rope loop which is tensioned as soon as the plastic envelope is filled with pressurized air.

Further, the invention provides a method for manufacturing a solar concentrator system. In a first step, a tubular plastic foil is manufactured, e.g. by means of an annular nozzle. Thereafter this tubular plastic foil is separated into two equal webs whereby one of the webs or sometimes both webs are provided with a reflecting layer on predetermined portions of the interior of the web. This layer will form the concentrator mirror. Further, at the beginning and at the end of the solar concentrator system a pillow block or a supporting frame is erected and clamping rails are arranged between said pillow blocks or supporting frames which extend in horizontal direction along the entire length of the plastic foil webs. The clamping rails serve to clamp the corresponding longitudinal edges of the two webs which are put together to a tubular form again. However, prior to interconnecting the two webs, the secondary concentrator and the heat exchanger are arranged within the frame formed by the clamping rails and the pillow blocks. In a final step the tubular foil is inflated by means of pressurized air. The entire arrangement is such that the two diametrally opposite clamping rail pairs are rotatably connected to the supporting frames with the result that the inflated tubular foil may be rotated around a horizontal axis in response to the position of the sun. It is understood that the two ends of the so formed plastic foil tube are closed in a suitable manner known per se and readily present to any person skilled in the art. In the embodiments described hereinabove the concentrator mirror has been located on a plastic foil having circular cylindrical shape, and a strip of the plastic foil running parallel to the axis of the cylinder is provided with a metallized layer serving as a reflecting face to concentrate the solar radiation hitting on this face. The width of the strip is limited to an opening angle at which all incident terminal rays are reflected to the focus line within an acceptable optical error. Due to optical reasons this angle shall be not more than approximately 30°. Using such an opening angle a concentration factor of approximately $c=46$ can be achieved, which is high enough to sufficiently heat a heat exchanger arranged in the focus line. However, if the diameter of the cylindrical tubular foil is not to exceed a still acceptable size the reflecting strip is quite narrow, with the result that only little radiation is trapped and concentrated in the focus line. If the reflecting strip is made larger the solar rays in the edge portions are not reflected to the focus line of the mirror and do not assist in heating the heat exchanger due to spheric aberration and due to caustic.

In order to avoid this disadvantage, it has been suggested to use a secondary concentrator which is hit by the rays caustically reflected by the edge portions of the metallized strip and which reflects the rays concentratedly to a heat exchanger located in the focus line of the secondary concentrator. However, the use of a secondary concentrator can be avoided, as will be explained in the following with reference to FIGS. 3–8.

The basic aim is to provide a solar concentrator system having a width not greater than a solar concentrator design with a cylindrical inflated tubular plastic foil but which yields a much higher efficiency even if only .One concentrator mirror and embodiment, it shall be possible to arrange the heat exchanger outwards of the pressurized space.

In a first approach, the theoretical basis of the proposed embodiments will be further explained with reference to FIG. 3.

Figure 3:
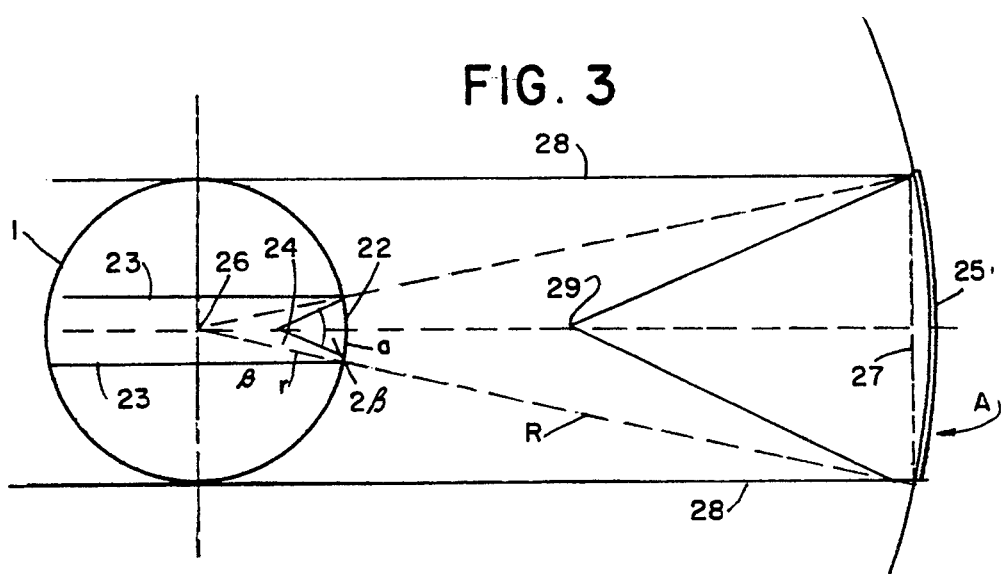
FIG. 3 shows a diagram to explain the theoretical basics of a preferred embodiment of the invention.

In FIG. 3 there is provided a highly transparent plastic tube 21 having circular cross-section and being pressurized in its interior. The plastic tube 21 comprises a strip-like portion 22 which is provided with a reflecting layer. The width of the strip-like portion 22 is chosen such that the strip includes an area in the region of a central angle $\beta=30°$. The radius of the cylindrical plastic tube 21 is designated with r and the arc length corresponding to the width of the strip-like portion 22 is designated with a. In this design only the marginal rays 23 are reflected to the focus line 24 of the strip 22 serving as a mirror; the reflection takes place under a convergence angle of approximately $2\beta=60°$.

Now the solely effective section of the cylindrical plastic tube 21, i.e. the strip-like portion 22, is enlarged according to the law of similarity by projecting it to an arc-shaped strip 25 having the same central axis 26 as the cylindrical plastic tube 21 and having a radius R at which the chord 27 is not greater than the diameter r of the plastic tube 21. The arc-shaped strip 25, which is well defined in this manner, is provided with a reflecting layer reflecting all incident solar radiation as far it is within the marginal rays 28 into the focus line 29.

It can further be seen in FIG. 3 that in using the conventional design with a plastic tube 21 having a radius r, the really effective projection area corresponds to an area which is defined by the width of the strip-like portion 22. The strip-like portion 22 is well defined by the central angle $\beta = 30°$ and by the convergence angle of $2\beta = 60°$ at a predetermined radius r. Therefrom the arc length a of the strip-like portion 22 which is relevant for the area can easily be calculated: $a = 2 \cdot r \cdot pi/\beta$. The arc length A of the strip 25 can be calculated in the same manner: $A = 2 \cdot R \cdot pi/\beta$. It follows: $a/A = r/R = \sin \beta/2 = \sin 15° = 0.25882$. Finally, the result therefrom is: $A = 1/0.25882 = 3.86637 \cdot a$. At the same space requirements determined by the radius r a nearly four times bigger area can be used to effectively trap incident solar radiation. It shall be mentioned that an approximately forty times bigger concentration of the received solar energy results at the chosen central angle of 30°; therefore enough heat energy is present to sufficiently heat a heat exchanger.

Thus, according to the invention, a plastic tube is not used any longer but a metallized foil strip which is evenly curved around its longitudinal central axis and calculated according to the preceding explanations, whereby a heat exchanger is arranged in the focus line of the curved metallized foil strip.

Figure 4:
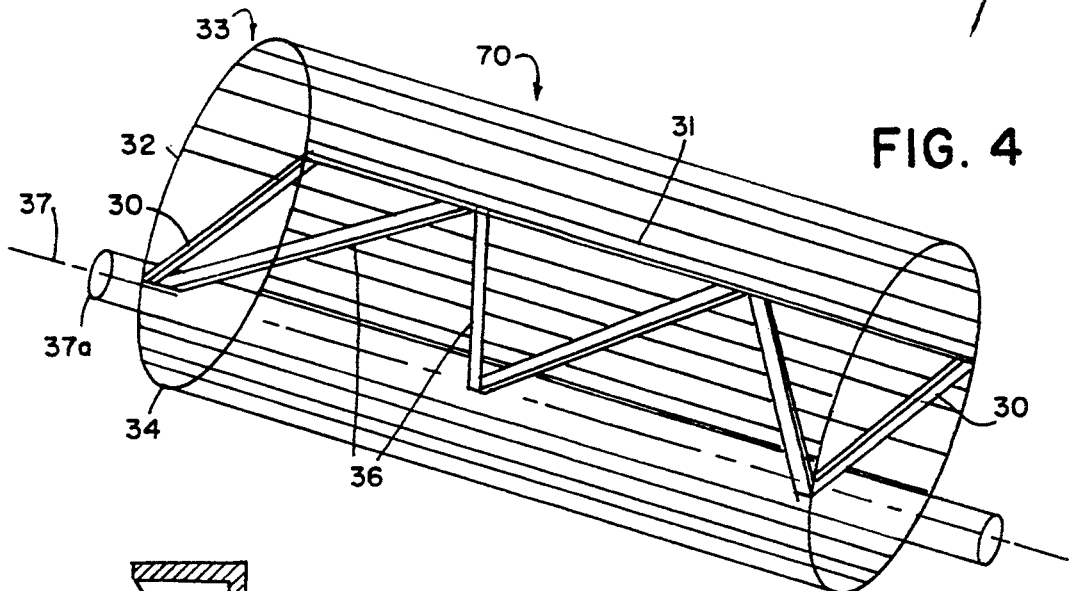
FIG. 4 shows a schematic perspective view of a further embodiment of the solar concentrator system according to the invention.

A practical embodiment of a foil strip suitable for the construction of a solar concentrator system is shown in FIG. 4.

After the length of the chord 27 having been calculated according to the preceding explanations, a frame is built having rectangular shape and comprising two short struts 30 as well as two long struts 31. The length of the short struts 30 corresponds to the calculated length of the chord 27, while the length of the longer struts 31 results from practical and constructive point of views.

A rectangular plastic foil 32 being provided with a metallized reflecting layer is fixed to the two longer struts 31 along its edges, these longitudinal edges having the same length as the struts 30. The length of the transverse edge 33 of the reflecting plastic foil 32 corresponds to arc-length A in FIG. 3 and can be calculated accordingly by assuming a central angle $\beta = 30°$ again. Thus, the reflecting plastic foil 32 can be exactly cut to the proper size and connected to the two longer struts 31 at one side of the frame.

In addition, a transparent foil 34 having the same size as the plastic foil 32 is connected to the longer struts 31 on the other side of the frame, with the result that a tube-like member is formed which is air-tightly sealed at both ends. For this purpose (not shown) cover foils 35 are used. In order to enhance the rigidity of the frame, a number of transverse struts 36 are provided which interconnect the two longer struts 31.

A receiver tube 37a is arranged in the focus line 37 of the reflecting foil 32, and a heat carrier liquid is circulated through the receiver tube 37a. Depending on the size of the reflecting foil 32, the focus line is located within or beyond the space limited by the reflecting foil 32 and the transparent foil 34, which results after said space having been filled with pressurized air. Thereby the foils 32 and 34 are tensioned and take the operating position. Furthermore, the focus line 37 must be adjusted according to the east-west-axis.

Figure 5:
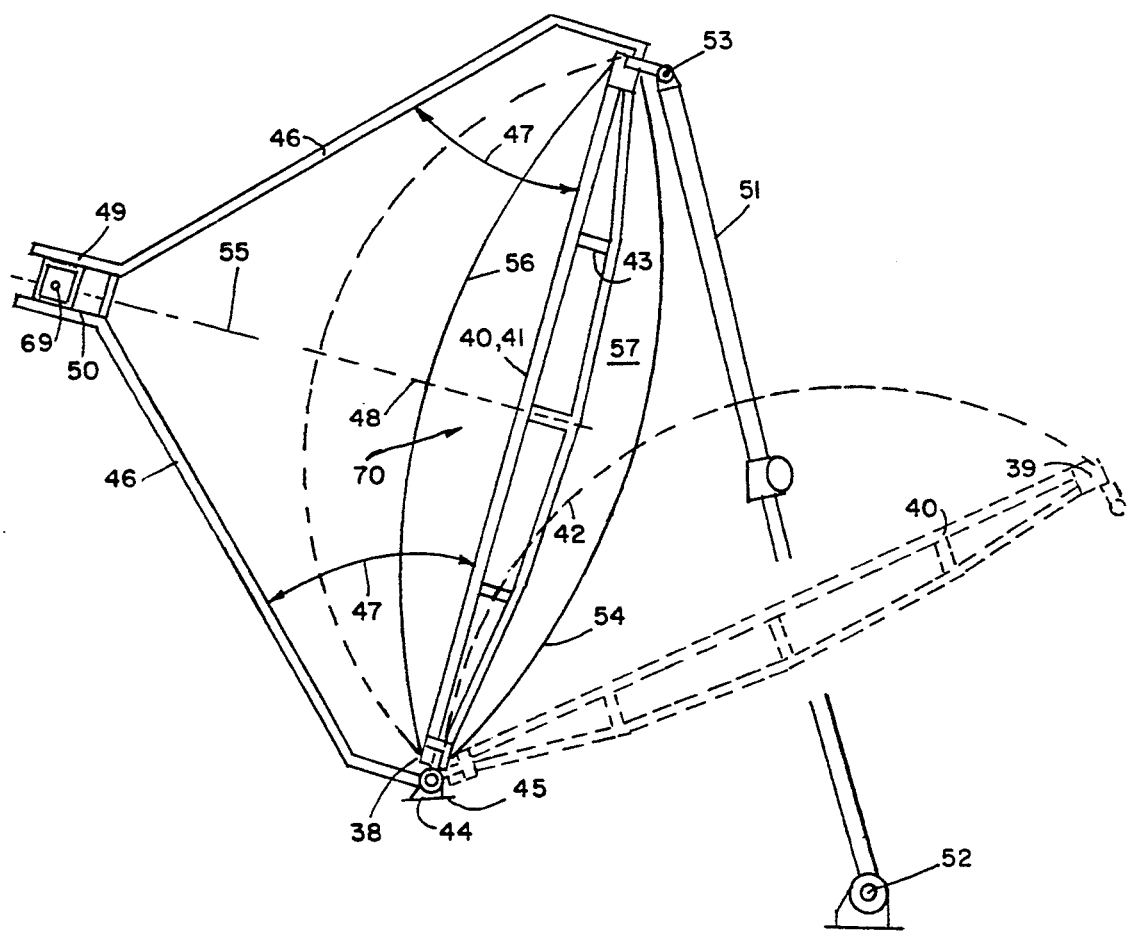
FIG. 5 shows a side view of a further embodiment of the solar concentrator system according to the invention.

Another embodiment of the solar concentrator system according to the invention is shown in FIG. 5, which exhibits a schematic lateral view. In this embodiment a frame 70, including longitudinal struts 38 and 39 and transverse struts 40 and 41, is used and the rigidity of this frame is enhanced by slightly curved auxiliary struts 42 and distance pieces 43. The frame 70 is pivotally supported in a bearing member 44 and can be rotated in a vertical plane. The pivot axis 45 of the bearing member 44 is close to the floor and extends in horizontal direction parallel to the longitudinal struts 38 and 39.

Furthermore, the frame 70 is provided with two cantilever arms 46 which are connected to the frame 70 in the region of its longitudinal struts 38 and 39, which include with the plane of the frame 70 the same angle 47 and which form a fixture 49 located in the region of a central plane 48 extending perpendicularly to the frame 70. The fixture 49 is located exactly in the focus line 69, which extends exactly perpendicularly to the drawing plane. The focus line 69 belongs to a reflecting foil strip which is connected to the frame 70, as will be further described hereinbelow. The two cantilever arms 46 are fixed to the frame 70 in such a manner that they are moved together with the frame 70, with the result that the position of the fixture 49 always remains in the focus line 69. A heat exchanger 50 is mounted in the fixture 49; the heat exchanger 50 extends exactly along the focus line 69 and a heat carrier liquid circulates in the heat exchanger 50.

To enable the frame 70 including the heat exchanger 50 to be pivoted and fixed in a desired position, a telescopic tube 51 is provided which is pivotally connected to a bearing 52 at its one end, and at its other end by a connecting member 53 to the upper longitudinal struts 39. By reducing the length of the telescopic tube 51, the frame 70 can be pivoted from the position shown in solid lines to the position shown in dashed lines.

The side of the frame 70 remote from the heat exchanger 50 is provided with a reflecting foil strip 54 the width thereof is calculated as described hereinabove and which forms a reflecting mirror having a focus line 69 located in the central axis of the heat exchanger 50.

The other side of the frame 70 facing the heat exchanger 50 is provided with a transparent foil 56, and the space 57 between the two foils 54 and 56 is airtightly sealed at both ends by means of suitable covering members (not shown). Thus, a pressure which is higher than the atmospheric pressure can be created in the space 57 between the two foils, whereby the two foils are tensioned and the reflecting foil strip 54 will take the predetermined and calculated shape.

Figure 6:
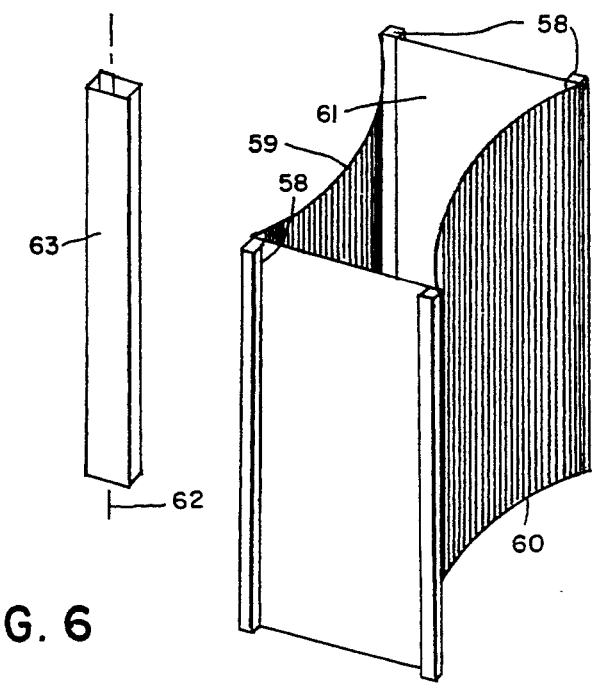
FIGS. 6–8 show schematic views of further variants of the proposed solution.

A further embodiment of the solar concentrator system according to the invention is schematically shown in FIG. 6. Here a frame 58 is used which is covered at one side thereof with a reflecting foil 60 which must not be transparent. The frame 58 is completely sealed such that an air-tight space 61 results between the two foils 59 and 60 which is evacuated. Thereby the reflecting foil 59, as well as the inexpensive foil 60, will take the desired shape which has been calculated as hereinbefore described. A heat exchanger 63 is arranged in the focus line 62 of the reflecting foil 59, whereby the constructive details will not be further discussed here since they are readily present to any person skilled in the art. Again, the central angle amounts to 30° and the convergence angle amounts to 60°, with the result that a concentration factor of $c = 46$ can be achieved.

Figure 7:
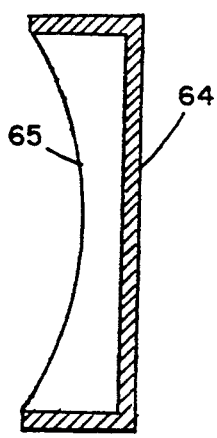

In place of the frame design just described, another design as shown in FIG. 7 can be used. Here a rectangular box-like structure 64 corresponding to the final size of the reflecting foil and having an open side is used which is covered with a reflecting foil 65. The interior of the box-like structure 64 is evacuated, with the result that the reflecting foil 65 will take the desired shape. According to FIG. 8, the box-like structure 64 can be replaced by a curved rigid sandwich structure 66 which again is forced into the desired shape by evacuating the space 68 between the reflecting foil 67 and the sandwich structure 66. The shape of the reflecting foil 67 is calculated as hereinbefore described.

Figure 8:
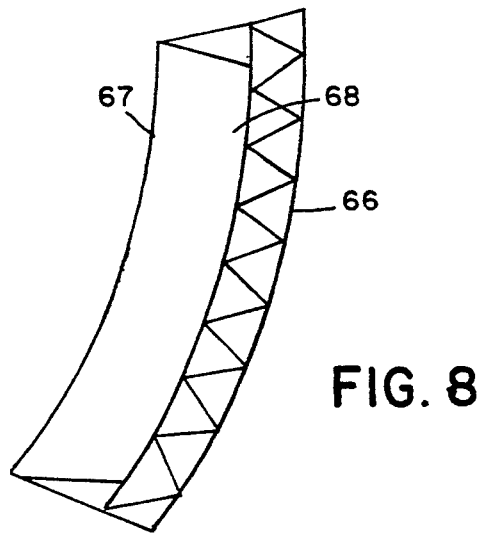

The embodiments according to FIGS. 6–8 are particularly advantageous, as they allow a simple and inexpensive construction and erection of the solar concentrator system. Particularly the need to use a highly transparent foil is completely removed, or it can be replaced by an inexpensive foil which is not transparent. It is essential in all embodiments that no danger can occur in case of a malfunction of the solar concentrator system; particularly the transparent foil serving as a window cannot burn as the concentration factor of the said inexpensive foil amounts to approximately $c=2$.

Furthermore, the efficiency of the embodiments according to FIGS. 6–8 is even higher as the incident radiation has not to pass a transparent foil where a portion of the radiation is deviated and absorbed.

A further advantage is that the heat exchanger is not located in a space where a higher or lower pressure exists than in the atmosphere, with the result that it is easily accessible to be readily adjusted, replaced or repaired.

I claim:

1. A solar concentrator system comprising at least one metallized foil strip, a heat exchanger means located in front of said metallized foil strip along a lengthwise direction of the tubular foil, such that solar radiation hitting on metallized surface of said metallized foil strip is reflected towards said heat exchanger means, said metallized foil strip being curved in the shape of a circular arc in cross-section and being part of a foil having one surface subjected to a pressure substantially different from the atmospheric pressure, wherein said metallized foil strip forms a primary concentrator mirror means, said system further comprising a secondary concentrator mirror means having a reflecting surface and cooperating with said primary concentrator mirror means, said first concentrator mirror means reflecting solar radiation from its metallized surface to said reflecting surface of said secondary concentrator mirror means, and said system further comprising the heat exchanger means located in the focus line of said secondary concentrator mirror means such that solar radiation reflected by said reflecting surface of said secondary concentrator mirror means impinges on said heat exchanger means, wherein said primary concentrator mirror means and said secondary concentrator mirror means are connected to each other to form an integral constructive unit, whereby said heat exchanger means and said integral constructive unit are rotatable relative to each other around the focus line of said secondary concentrator mirror means, wherein said primary concentrator mirror means is located on the inner surface of an envelope having the shape of a circular cylinder jacket made of flexible plastic material with a horizontally running central axis, said envelope being sealed at its both ends and being in tensioned condition de to an interior pressure which is higher than the atmospheric pressure, wherein said tensioned tubular plastic envelope rests on support means located in the region of both ends of said tubular envelope, and comprising annular supporting means which are arranged concentrically to said heat exchanger means.

2. A solar concentrator system according to claim 1, in which said annular supporting means are rigidly connected to said support means to form together a rigid frame.

3. A solar concentrator system according to claim 2, in which said annular supporting means are in the form of rigid semicircular rings or in the form of closed rope loops.

4. A solar concentrator system according to claim 3, in which said tubular flexible plastic envelope consists of two rectangular elongate webs, each two corresponding longitudinal edges of the two webs being sealingly fixed to each other by means of a clamping rail.

5. A solar concentrator system according to claim 4, in which said annular supporting means are in the form of rigid semicircular rings or closed rope loops connected to said clamping rails.

6. A solar concentrator system according to claim 1, in which said flexible plastic envelope is cylindrical or barrel-shaped and comprises an astigmatic mirror surface.

7. A solar concentrator system according to claim 1, in which said integral constructive unit is rotatable around said fixedly mounted heat exchanger means in response to the position of the sun.

8. A solar concentrator system according to claim 7, in which said integral constructive unit is fixedly mounted, whereby said heat exchanger means is adjustable relative to said integral constructive unit in response to the position of the sun.

9. A solar concentrator system according to claim 8, in which heat exchange means is cranked and comprises an angled leg which is adjustable relative to said integral constructive unit in response to the position of the sun.

10. A solar concentrator system according to claim 9, in which said lens-shaped envelope is enclosed by a supporting frame.

11. A solar concentrator system according to claim 1, in which said primary concentrator mirror means is located on the inner surface of a stationary air-inflated tent, whereby said heat exchanger means is arranged in the interior of said air-inflated tent and is adjustably mounted along a circular path.

12. A solar concentrator system according to claim 1, in which said metallized foil strip is the centrally projected image of the reflecting part of an imaginary tubular foil concentrator having a circular cross-section on a face which is curved in the shape of a circular arc around the central axis of said circular cylinder of said tubular foil concentrator with a predetermined radius, whereby said projected image of said reflecting part has the same central angle and the same center as said reflecting part of said tubular foil concentrator, and whereby the radius of curvature of said projected image is not greater than the radius of said tubular foil concentrator divided by the sine value of half the central angle.

13. A solar concentrator system according to claim 12, comprising a frame, one side of said frame being covered by a metallized reflecting foil and the other side being covered by a transparent foil, the space between said foils being air-tightly sealed and pressurized.

14. A solar concentrator system according to claim 13, in which the heat exchanger means is located along the focus line of said metallized reflecting foil.

15. A solar concentrator system according to claim 12, comprising a frame pivotally mounted around a horizontally running axis, one side of said frame being covered by a metallized reflecting foil and the other side being covered by a transparent foil, the space between said foils being air-tightly sealed and pressurized, the focus line of said metallized reflecting foil being outside of said pressurized space, and comprising the heat exchanger means extending along said focus line and being connected to said frame to be pivotal together with said frame.

16. A solar concentrator system according to claim 15, in which said frame comprises two cantilever arms, both cantilever arms enclosing the same angle with the plane of said frame, said two cantilever arms comprising a fixture located in the central plane extending perpendicularly to the plane of said frame and receiving said heat exchanger means.

17. A solar concentrator system according to claim 16, in which said frame comprises a telescopic tube, one end thereof being pivotally connected to the top of said frame and the other end being pivotally supported on the floor, in order to enable said frame together with the associated cantilever arms supporting said heat exchanger means to be pivoted and fixed in a predetermined position.

18. A solar concentrator system according to claim 12, comprising a frame, one side of said frame being covered by a metallized reflecting foil and the other side being covered by a cover foil, the space between said foils being air-tightly sealed and having a pressure which is lower than the atmospheric pressure.

19. A solar concentrator system according to claim 12, comprising a rigid box-like structure which is open at one side, said open side being covered by the metallized reflecting foil strip and the interior of said box-like structure having a pressure which is lower than the atmospheric pressure.

20. A solar concentrator system according to claim 12, comprising a rigid sandwich structure covered by the metallized reflecting foil strip, whereby a sealed space is formed between said rigid sandwich structure and said metallized reflecting foil in a calculated shape.

21. A process of manufacturing a solar concentrator system comprising the steps of providing a flexible plastic tube, cutting said plastic tube into two webs, applying a reflecting layer to the inner side of at least one of said webs at predetermined portions thereof, thereby forming a primary concentrator mirror means, providing a heat exchanger means, enclosing said heat exchanger means by said two webs, connecting one of said webs to the other one of said webs along their edges, and pressurizing the interior of the space between said two webs, providing a secondary concentrator mirror means having a reflecting surface cooperating with said primary concentrator mirror means, reflecting solar radiation from the reflecting layer of said first concentrator mirror means to said reflecting surface of said secondary concentrator mirror means, and locating the heat exchanger means in the focus line of said secondary concentrator mirror means whereby solar radiation reflected by said reflecting surface of said secondary concentrator mirror means impinges on said heat exchanger means, connecting said primary concentrator mirror means and said secondary concentrator mirror means to each other for forming an integral constructive unit, rotatably attaching said heat exchanger means and said integral constructive unit whereby the heat exchanger means and the constructive unit are rotatable relative to each other around the focus line of said secondary concentrator mirror means, locating said primary concentrator mirror means on the inner surface of an envelope having the shape of a circular cylindrical jacket made of flexible plastic material with a horizontally running central axis, sealing said envelope at its both ends and maintaining the envelope in a tensioned condition due to an interior pressure which is higher than the atmospheric pressure, resting said tensioned tubular plastic envelope on support means located in the region of both ends of said tubular envelope, and comprising annular supporting means which are arranged concentrically to said heat exchanger means.

* * * * *